(12) United States Patent
Agarwal

(10) Patent No.: US 10,708,433 B1
(45) Date of Patent: Jul. 7, 2020

(54) TECHNIQUES FOR RETRIEVING A VOICEMAIL PILOT NUMBER FROM A TELECOMMUNICATIONS NETWORK NODE

(71) Applicant: T-Mobile USA, Inc., Bellevue, WA (US)

(72) Inventor: Bikash Agarwal, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/416,027

(22) Filed: May 17, 2019

(51) Int. Cl.
*H04M 3/533* (2006.01)
*H04W 8/04* (2009.01)

(52) U.S. Cl.
CPC ... *H04M 3/53333* (2013.01); *H04M 3/53325* (2013.01); *H04W 8/04* (2013.01)

(58) Field of Classification Search
CPC ........ H04M 3/53333; H04M 3/53325; H04W 8/04
USPC .......................................................... 455/413
See application file for complete search history.

(56) References Cited

U.S. PATENT DOCUMENTS

| | | | | |
|---|---|---|---|---|
| 6,061,432 A | * | 5/2000 | Wallace | H04M 3/42068 379/219 |
| 2008/0207176 A1 | * | 8/2008 | Brackbill | H04M 1/7255 455/413 |
| 2008/0226043 A1 | * | 9/2008 | Srivastava | H04M 3/12 379/88.18 |
| 2011/0117882 A1 | * | 5/2011 | Luu | H04L 63/083 455/410 |
| 2013/0210390 A1 | * | 8/2013 | Lambert | H04L 63/083 455/411 |

* cited by examiner

*Primary Examiner* — William Nealon
(74) *Attorney, Agent, or Firm* — Perkins Coie LLP

(57) ABSTRACT

The disclosed embodiments include a method performed by a Telephony Application Server (TAS) or other telecommunications network node, to retrieve a voicemail pilot number during registration of a user equipment (UE). The method includes receiving a registration message to register the UE and, in response, sending a request message to a home subscriber server (HSS). The request message includes a request for a voicemail pilot number for the subscriber. The method further includes receiving an answer message from the HSS including the voicemail pilot number, which is stored at the TAS, receiving a voicemail service message to deposit/retrieve a voicemail message and, in response, retrieving the voicemail pilot number from the TAS instead of issuing an SS7 query to obtain the voicemail pilot number. The method further includes enabling the subscriber to deposit or retrieve the voicemail message based on the voicemail pilot number retrieved from the TAS.

19 Claims, 11 Drawing Sheets

| No. | Delta display | Time | Source | Destination | Protocol | Leng | Info |
|---|---|---|---|---|---|---|---|
| 1 | 0.000000 | 0.000000 | 10.193.13.68 | 10.169.49.69 | DIAMETER | ... | cmd=Subscribe-Notifications Request(308) flags=RP-- appl= |
| 2 | 0.013547 | 0.013547 | 10.169.49.69 | 10.193.13.68 | DIAMETER/XML | ... | cmd=Subscribe-Notifications Answer(308) flags=-P-- appl=3 |

Version: 0x01
Length: 976
▶ Flags: 0xc0, Request, Proxyable
  Command Code: 308 Subscribe-Notifications
  ApplicationID: 3GPP Sh (16777217)
  Hop-by-Hop Identifier: 0x6a49cf48
  End-to-End Identifier: 0x44692f39
  [Answer In: 2]
▶ AVP: Session-Id(263) l=51 f=-M- val=TAS2082.msg.lab.t-mobile.com;1147743788;270
▶ AVP: Destination-Realm(283) l=41 f=-M- val=epc.mnc300.mcc310.3gppnetwork.org
▶ AVP: Vendor-Specific-Application-Id(260) l=32 f=-M-
▶ AVP: Auth-Session-State(277) l=12 f=-M- val=NO_STATE_MAINTAINED (1)
▶ AVP: User-Identity(700) l=60 f=VM- vnd=TGPP
▶ AVP: Service-Indication(704) l=26 f=VM- vnd=TGPP val=4d4d54454c2d536572766936573
▶ AVP: Service-Indication(704) l=31 f=VM- vnd=TGPP val=494d532d4f44422d496e666f726d6174696f6e
▶ AVP: Service-Indication(704) l=30 f=VM- vnd=TGPP val=494d532d43414d454c2d536572766936573
▶ AVP: Service-Indication(704) l=33 f=VM- vnd=TGPP val=544d55532d435535344f4d2d457874656e73696f6e
▶ AVP: Service-Indication(704) l=41 f=VM- vnd=TGPP val=4d617621d434c492d53435245454e494e472d496e6666726d...
▶ AVP: Send-Data-Indication(710) l=16 f=-V-- vnd=TGPP val=USER_DATA_REQUESTED (1)
▶ AVP: Subs-Req-Type(705) l=16 f=VM- vnd=TGPP val=Subscribe (0)
▶ AVP: Data-Reference(703) l=16 f=VM- vnd=TGPP val=RepositoryData (0)
▶ AVP: Data-Reference(703) l=16 f=VM- vnd=TGPP val=ExtendedPriority (29)
▶ AVP: Data-Reference(703) l=16 f=VM- vnd=TGPP val=ServicePriorityLevel (23)
▶ AVP: Expiry-Time(709) l=16 f=V-- vnd=TGPP val=Jan 17, 2019 08:22:23.000000000 UTC
▶ AVP: Supported-Features(628) l=56 f=V-- vnd=TGPP
▶ AVP: Proxy-Info(284) l=316 f=-M-
▶ AVP: Route-Record(282) l=36 f=-M- val=TAS2082.msg.lab.t-mobile.com

*FIG. 2*

| No. | Delta display | Time | Source | Destination | Protocol | Leng | Info |
|---|---|---|---|---|---|---|---|
| 1 | 0.000000 | 0.000000 | 10.193.13.68 | 10.169.49.69 | DIAMETER | ... | cmd=Subscribe-Notifications Request(308) flags=RP-- appl=3 |
| 2 | 0.013547 | 0.013547 | 10.169.49.69 | 10.193.13.68 | DIAMETER/XML | ... | cmd=Subscribe-Notifications Answer(308) flags=-P-- appl=3 |

▶ Internet Protocol Version 4, Src: 10.169.49.69, Dst: 10.193.13.68
▶ Transmission Control Protocol, Src Port: diameter (3868), Dst. Port: toruxserver (5153), Seq: 1, Ack: 977, Len: 5724
▼ Diameter Protocol
    Version: 0x01
    Length: 5724
  ▶ Flags: 0x40, Proxyable
    Command Code: 308 Subscribe-Notifications
    ApplicationID: 3GPP Sh (16777217)
    Hop-by-Hop Identifier: 0x6a49cf48
    End-to-End Identifier: 0x4469239
    [Request In: 1]
    [Response Time: 0.013547000 seconds]
  ▲ AVP: Session-Id(263) l=51 f=-M- val=TAS2082.msg.lab.t-mobile.com;1147743788;270
  ▲ AVP: Auth-Session-State(277) l=12 f=-M- val=NO_STATE_MAINTAINED (1)
  ▲ AVP: Vendor-Specific-Application-Id(260) l=32 f=-M-
  ▲ AVP: Origin-Host(264) l=58 f=-M- val=vhssda01d001.hss.epc.mnc300.mcc310.3gppnetwork.org
  ▲ AVP: Origin-Realm(296) l=41 f=-M- val=epc.mnc300.mcc310.3gppnetwork.org
  ▲ AVP: Proxy-Info(284) l=316 f=-M-
  ▼ AVP: User-Data(702) l=5101 f=VM- vnd=TGPP val=3c3f786d6c207665727369666e3d22312e30222065e6e636f...
      AVP Code: 702 User-Data
    ▲ AVP Flags: 0xc0
      AVP Length: 5101
      AVP Vendor Id: 3GPP (10415)
      User-Data: 3c3f786d6c207665727369666e3d22312e30222065e6e636f...
    ▶ eXtensible Markup Language
      Padding: 000000
  ▲ AVP: Expiry-Time(709) l=16 f=-V-- vnd=TGPP val=Jan 17, 2019 08:22:23.000000000 UTC ▶ <Sh-IMS-Data>
  ▼ <Extension>
    ▶ <Extension>
      ▼ <VoicemailPilotNumber>
          0
          </VoicemailPilotNumber>
      ▲ <Extension>
          <Extension>
          </Extension>
        </Extension>
      </Sh-IMS-Data>
    </Sh-Data>
  Padding: 000000

| No. | Delta display | Time | Source | Destination | Protocol | Leng | Info |
|---|---|---|---|---|---|---|---|
| 517 | 0.000000 | 2017-12-01 22:06:37.830178 | 10.178.85.37 | 10.169.48.72 | DIAMETER | ... | cmd=User-Data Request(306) flags=RP-- appl= |
| 529 | 0.010549 | 2017-12-01 22:06:37.840727 | 10.169.48.72 | 10.178.85.37 | DIAMETER/XML | ... | cmd=User-Data Answer(306) flags=-P-- appl=3 |

▲ Frame 517: 454 bytes on wire (3632 bits), 454 bytes captured (3632 bits)
▲ Ethernet II, Src: RadisysC_07:df:92 (28:b9:d9:07:df:92), Dst: CiscoInc_9f:f2:ac (00:00:0c:9f:f2:ac)
▲ Internet Protocol Version 4, Src: 10.178.85.37, Dst: 10.169.48.72
▲ Transmission Control Protocol, Src Port: 10026), Dst Port: diameter (3868), Seq: 1, Ack: 1, Len: 388
▶ Diameter Protocol
    Version: 0x01
    Length: 388
▲ Flags: 0xc0, Request, Proxyable
    Command Code: 306 User-Data
    ApplicationID: 3GPP Sh (16777217)
    Hop-by-Hop Identifier: 0xeaf1310e
    End-to-End Identifier: 0x0691a684
    [Answer In: 529]
▲ AVP: Session-Id(263) l=59 f=-M- val=si01.beltas04.tas.sip.lab.t-mobile.com;1102208582;63
▲ AVP: Origin-Host(264) l=46 f=-M- val=si01.beltas04.tas.sip.lab.t-mobile.com
▲ AVP: Origin-Realm(296) l=28 f=-M- val=msg.lab.t-mobile.com
▲ AVP: Destination-Realm(283) l=41 f=-M- val=epc.mnc300.mcc310.3gppnetwork.org
▲ AVP: Vendor-Specific-Application-Id(260) l=32 f=-M-
▲ AVP: Auth-Session-State(277) l=12 f=-M- val=NO_STATE_MAINTAINED (1)
▲ AVP: Data-Reference(703) l=16 f=VM- vnd=TGPP val=UE-SRVCC-Capability (28)
▲ AVP: Data-Reference(703) l=16 f=VM- vnd=TGPP val=STN-SR (27)
▲ AVP: User-Identity(700) l=32 f=VM- vnd=TGPP
▲ AVP: User-Name(1) l=23 f=-M- val=31031099004581
▲ AVP: Supported-Features(628) l=56 f=V-- vnd=TGPP

*FIG. 9*

| No. | Delta display | Time | Source | Destination | Protocol | Leng | Info |
|---|---|---|---|---|---|---|---|
| 517 | 0.000000 | 2017-12-01 22:06:37.830178 | 10.178.85.37 | 10.169.48.72 | DIAMETER | ... | cmd=User-Data Request(306) flags=RP-- appl= |
| 529 | 0.010549 | 2017-12-01 22:06:37.840727 | 10.169.48.72 | 10.178.85.37 | DIAMETER/XML | ... | cmd=User-Data Answer(306) flags=-P-- appl=3 |

▲ Transmission Control Protocol, Src Port: diameter (3868), Dst. Port: (10026), Seq: 1, Ack: 389, Len: 552
▼ Diameter Protocol
   Version: 0x01
   Length: 552
  ▲ Flags: 0x40, Proxyable
   Command Code: 306 User-Data
   ApplicationID: 3GPP Sh (16777217)
   Hop-by-Hop Identifier: 0xeaf1310e
   End-to-End Identifier: 0x069a684
   [Request In: 517]
   [Response Time: 0.010549000 seconds]
  ▲ AVP: Session-Id(263) l=59 f=-M- val=si01, beltas04.tas.sip.lab.t-mobile.com;110208582;63
  ▲ AVP: Auth-Session-State(277) l=12 f=-M- val=NO_STATE_MAINTAINED (1)
  ▲ AVP: Vendor-Specific-Application-Id(260) l=32 f=-M-
  ▲ AVP: Origin-Host(264) l=54 f=-M- val=hssch001.hss.epc.mnc300.mcc310.3gppnetwork.org
  ▲ AVP: Origin-Realm(296) l=41 f=-M- val=epc.mnc300.mcc310.3gppnetwork.org
  ▼ AVP: User-Data(702) l=260 f=VM- vnd=TGPP val=3c3f786d6c20766572733696f6e3d22312e30222206566636f...
    AVP Code: 702 User-Data
   ▲ AVP Flags: 0xc0
    AVP Length: 260
    AVP Vendor Id: 3GPP (10415)
    User-Data: 3c3f786d6c20766572733696f6e3d22312e30222206566636f...
   ▲ eXtensible Markup Language
  ▲ AVP: Suported-Features(628) l=56 f=V-- vnd=TGPP
  ▲ AVP: Result-Code(268) l=12 f=-M- val=DIAMETER_SUCCESS (2001)

eXtensible Markup Language (xml), 248 bytes | Packets: 2925 · Displayed: 2 (0.1%) · Load time: 0:0.60 | Profile: Default

*FIG. 10*

TECHNIQUES FOR RETRIEVING A VOICEMAIL PILOT NUMBER FROM A TELECOMMUNICATIONS NETWORK NODE

BACKGROUND

Voice over Long-Term Evolution (VoLTE), a standard for high-speed wireless communication for user equipment (UE) such as mobile phones and data terminals, is based on the IP Multimedia Subsystem (IMS) network, with specific profiles for control and media planes of voice service on LTE. Voice service is delivered as data flows within the LTE data bearer, which provides three times more voice and data capacity than 3G UMTS, up to six times more than 2G GSM, and frees up bandwidth because VoLTE packet headers are smaller than those of unoptimized VoIP/LTE.

During a VoLTE call, an originating subscriber seeks to establish a call with a terminating subscriber. The terminating subscriber, however, may not answer the call. In response, a Telephony Application Server (TAS) can initiate a call forwarding procedure, which includes call forward not reachable (CFNR); call forwarding unconditional (CFU); and call forwarding busy (CFB). A call forwarding procedure uses a subscriber's profile information to retrieve a voicemail pilot number from the voicemail server. The pilot number is an SS7 number that designates a directory number to access the subscriber's voicemail messages. Each pilot number can belong to a different voicemail messaging system.

An analogous process occurs for voicemail message retrieval. For example, a subscriber can dial a number on a UE to access voicemail messages. During a procedure to deposit/retrieve a voicemail message, the TAS issues an Intelligent Network Application Protocol (INAP) query to obtain the subscriber's pilot number from the voicemail server. Based on the INAP response, the TAS sends an INVITE message to request that an endpoint join a SIP session to deposit/retrieve the voicemail message to/from a voicemail server.

BRIEF DESCRIPTION OF THE DRAWINGS

Embodiments of the present technology will be described and explained through the use of the accompanying drawings.

FIG. 2 illustrates a subscriber notification request (SNR) message of a registration procedure according to some embodiments of the present disclosure;

FIG. 3 illustrates a subscriber notification answer (SNA) message of a registration procedure according to some embodiments of the present disclosure;

FIG. 7 illustrates a message sent when a user dials a number to retrieve a voicemail message from a voicemail server according to some embodiments of the present disclosure;

FIG. 8 illustrates a message sent by a Telephony Application Server (TAS) where the message includes the requested pilot number according to some embodiments of the present disclosure;

FIG. 9 illustrates a user data request (UDR) message to update a pilot number according to some embodiments of the present disclosure;

FIG. 10 illustrates a user data answer (UDA) message to update a pilot number according to some embodiments of the present disclosure.

Figure 1:
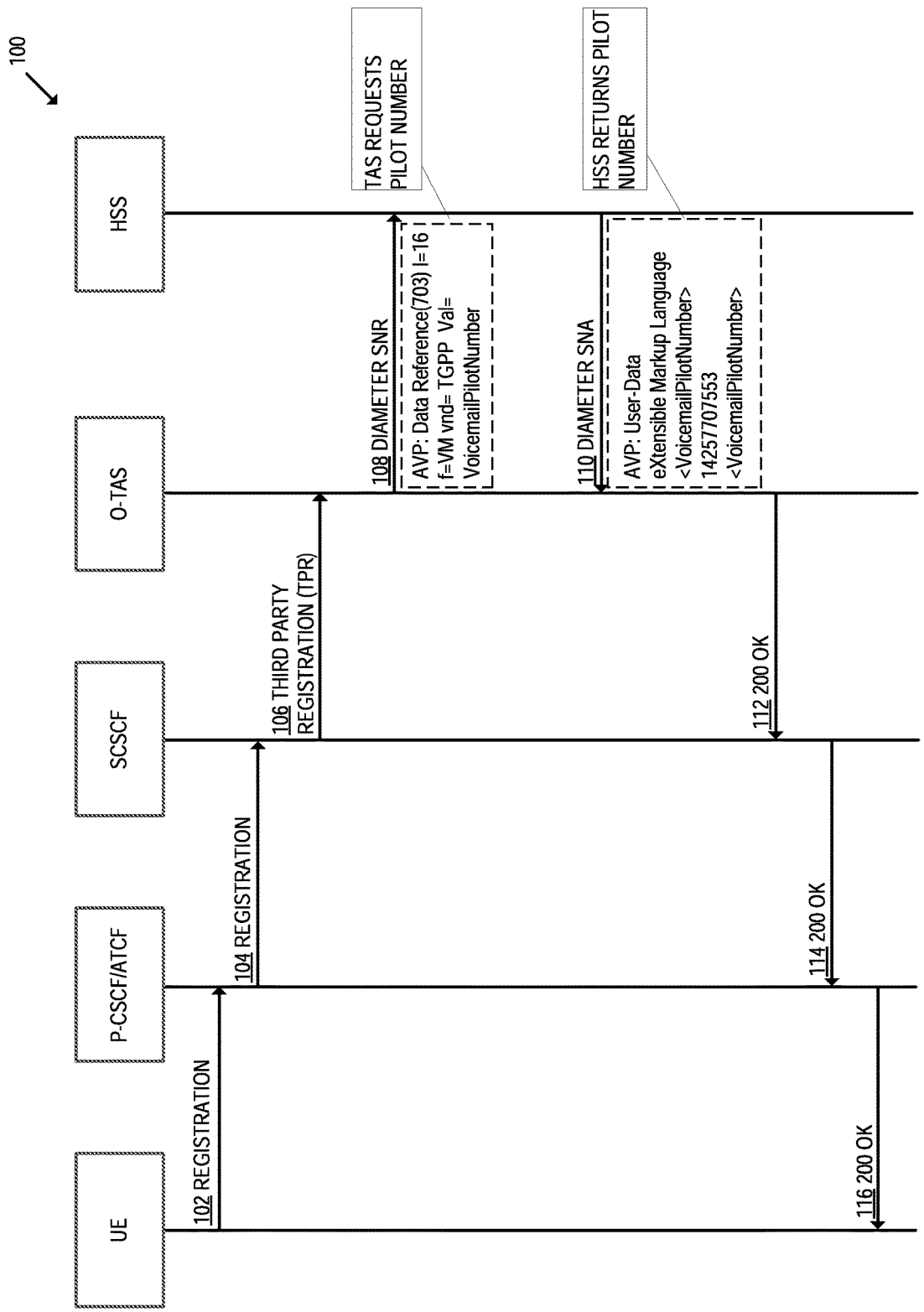
FIG. 1 is a flow diagram that illustrates a process for retrieving a pilot number during an IP multimedia subsystem (IMS) registration procedure according to some embodiments of the present disclosure.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described herein. On the contrary, the technology is intended to cover all modifications, equivalents, and alternatives falling within the scope of the technology as defined by the appended claims.

DETAILED DESCRIPTION

One problem with voicemail retrieval is that the TAS must send an SS7 query to obtain a subscriber's pilot number each time that the subscriber seeks to deposit/retrieve voicemail messages. The systems and methods disclosed herein generally relate to a technique for reducing the signaling required for voicemail services. In particular, the disclosed embodiments reduce the amount of signaling required to deposit or retrieve voicemail messages. This is achieved by reducing the amount of signaling required to obtain a subscriber's pilot number. Specifically, the disclosed embodiments eliminate the need for a Telephony Application Server (TAS) to issue an SS7 query to obtain the subscriber's pilot number each time that the subscriber seeks to deposit or retrieve a voicemail message. Instead, the TAS retrieves the pilot number during a registration, refresh, or update procedure of a user equipment (UE). The TAS maintains a subscriber's current pilot number independent of procedures to deposit or retrieve voicemail messages. As such, the TAS can forego needing to issue an SS7 query to obtain the pilot number from the voicemail server to deposit or retrieve voicemail messages.

Specifically, during a Voice over Long-Term Evolution (VoLTE) call, a terminating subscriber may not answer the call from an originating subscriber. The TAS can then initiate a call forwarding procedure to deposit a voicemail message. The TAS uses the locally available subscriber profile information to retrieve a voicemail pilot number from the voicemail server. The pilot number designates a directory number to access the subscriber's voicemail messages. For example, the TAS can issue an Intelligent Network Application Protocol (INAP) query to obtain the pilot number from the voicemail server. Based on the response to the INAP query, the TAS sends an INVITE message to establish a session for depositing the voicemail message. An analogous process occurs for voicemail retrieval.

A TAS is an entity in a telephone network that carries out functions that are not directly related to the routing of messages through the network. Such functions can include in-network answering machines, automatic call forwarding, conference bridges and many other types of applications. The TAS provides call-termination or subscriber-independent applications. These include such capabilities as local number portability; free-call routing resolution; conference bridge services; and unified messaging. TAS applications are of two general types, those that are signaling only, and those that involve media manipulation. The former are often related to routing resolution—local number portability, free-call routing, and other services where the dialed number must be translated to a routable address. An example involving media manipulation would be conference bridge applications.

Thus, the TAS maintains subscriber profile information about the subscriber but not routing instructions. The TAS can deposit or retrieve voicemail messages by sending an SS7 query to a voicemail server to obtain the subscriber's pilot number. The pilot number is used with routing instructions to deposit or retrieve a voicemail message at voicemail server. Therefore, every time that a subscriber deposits or retrieves a voicemail message, the TAS needs to issue an SS7 query to obtain the pilot number from the voicemail server.

In the current solution, when a subscriber requests to deposit or retrieve voicemail messages, the TAS does not need to issue an SS7 query to retrieve a pilot number because the TAS obtained the pilot number during a prior registration, refresh, or update procedure. The TAS maintains the pilot number at the TAS independent of procedures to deposit or retrieve voicemail messages. Hence, the disclosed embodiments reduce the amount of signaling required to deposit or retrieve voicemail messages by eliminating the need for the TAS to routinely query for pilot numbers. Note that while operations are described herein as being implemented by the TAS, some or all operations can be performed by other servers or nodes in the telecommunications network.

FIG. 1 is a flow diagram that illustrates a process 100 for retrieving a pilot number during an IP multimedia subsystem (IMS) registration procedure according to some embodiments of the present disclosure. In 102, a UE sends a registration message to the proxy-call session control function (P-CSCF)/access transfer control function (ATCF). The UE sends this message to inform a SIP server of its location. In 104, the P-CSCF/ATCF sends the registration message to the serving call session control function (SCSCF). In 106, the SCSCF sends a third-party registration (TPR) message to the originating-TAS (O-TAS). The purpose of the TPR message is to let the O-TAS know that the UE is now connected and ready to communicate. In 108, in response to the TPR message, the O-TAS sends a request to the home subscriber server (HSS) for the pilot number. The HSS is the main IMS database that concatenates the home location register (HLR) and the authentication center (AuC). In the IMS architecture, the HSS connects to application servers as well as the CSCF by using the Diameter protocol.

In the illustrated example, the O-TAS sends a Diameter subscriber notification request (SNR) to the HSS. In this example, the pilot number is retrieved during registration by adding specific attribute-value pairs (AVPs) to the SNR and subscriber notification answer (SNA) messages. During a registration procedure, the TAS will send the AVP in the SNR request. The SNR includes an AVP that requests the subscriber's pilot number. As shown, to migrate from using SS7 queries to using Diameter messages, the TAS adds an AVP with Data Reference (703) I=16 f=VM vnd=TGPP Val=VoicemailPilotNumber in an SNR. For example, FIG. 2 illustrates an SNR message of a registration process according to some embodiments of the present disclosure. In this example, the SNR message could be modified to include the AVP requesting the pilot number. In 110 of FIG. 1, the HSS responds with a Diameter SNA that includes the requested pilot number. The O-TAS saves the retrieved pilot number with subscriber's local profile along with other information about subscriber capabilities. The SNA adds an AVP including the pilot number. For example, FIG. 3 illustrates an SNA of a registration procedure where the SNA message could be modified to include the AVP for the requested pilot number.

The O-TAS adds an AVP to an SNR message to request the pilot number, and the HSS responds with the pilot number in another AVP in the SNA message. Lastly, a 200 Series response is communicated between the TAS and UE in 112, 114, and 116 of FIG. 1, which means that the request was successful. As such, registration is complete, and the network session ends. The obtained pilot number may then be used to update the subscriber profile information maintained at the O-TAS.

The registration process could also occur during a periodic refresh procedure. For example, a telecommunication network may cause UE's to re-register periodically (e.g., every 30 minutes). As such, the TAS is periodically updated with subscriber information, which could capture any change to the pilot number.

The disclosed embodiments are not limited to the aforementioned examples. Instead, in some embodiments, the TAS can send any request message for the pilot number during a registration procedure and receive the pilot number from the HSS in an answer message. The TAS maintains and updates a subscriber's profile information including the pilot number independent of any procedure to deposit or retrieve voicemail messages. By decoupling the procedure to retrieve the voicemail pilot number from the procedure to deposit or retrieve voicemail messages, the TAS can reduce the amount of signaling required to deposit or retrieve voicemail messages, thereby eliminating the need to issue SS7 queries to obtain pilot numbers.

Figure 4:
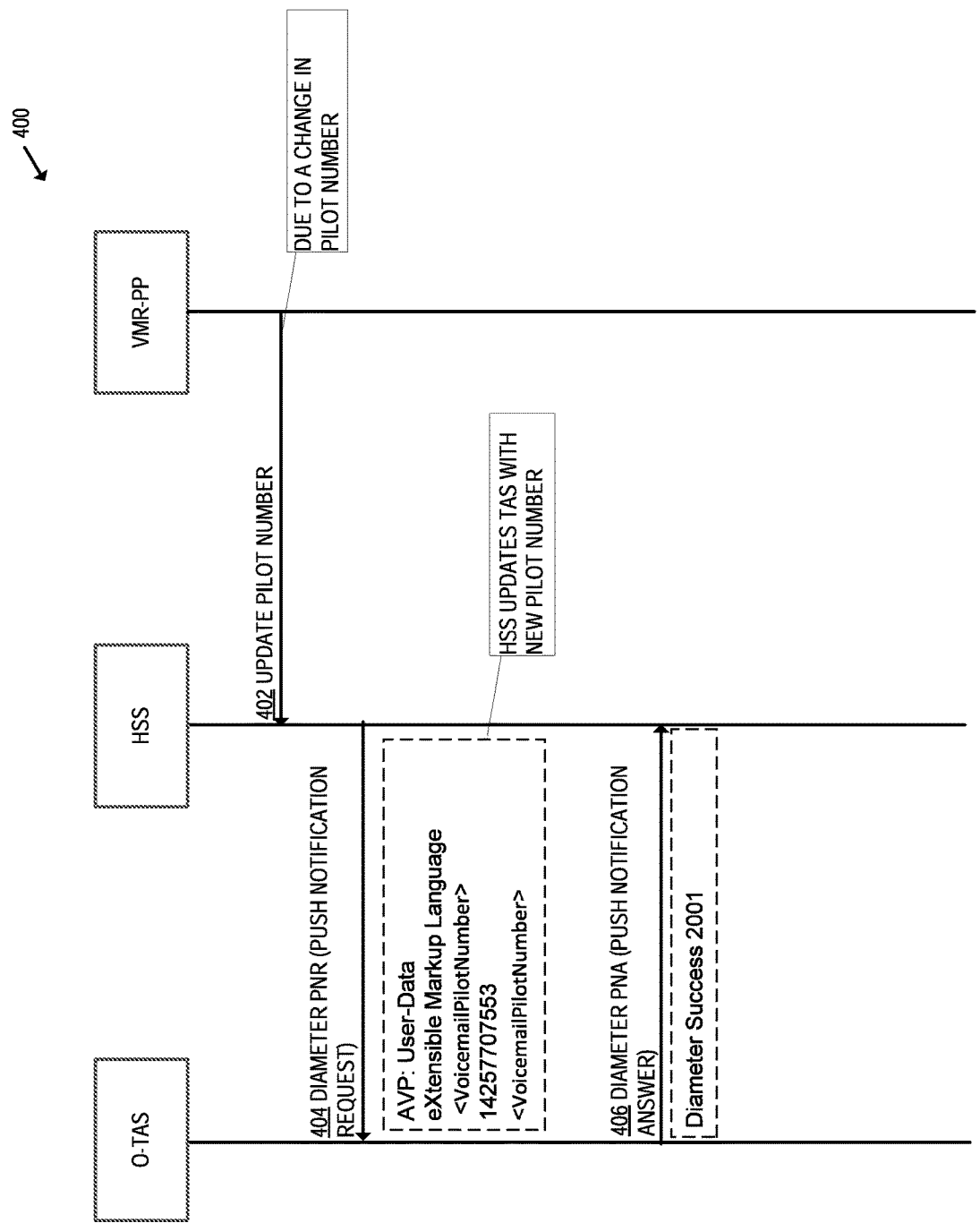
FIG. 4 is a flow diagram that illustrates a process for dynamically updating a pilot number according to some embodiments of the present disclosure.
Figure 5:
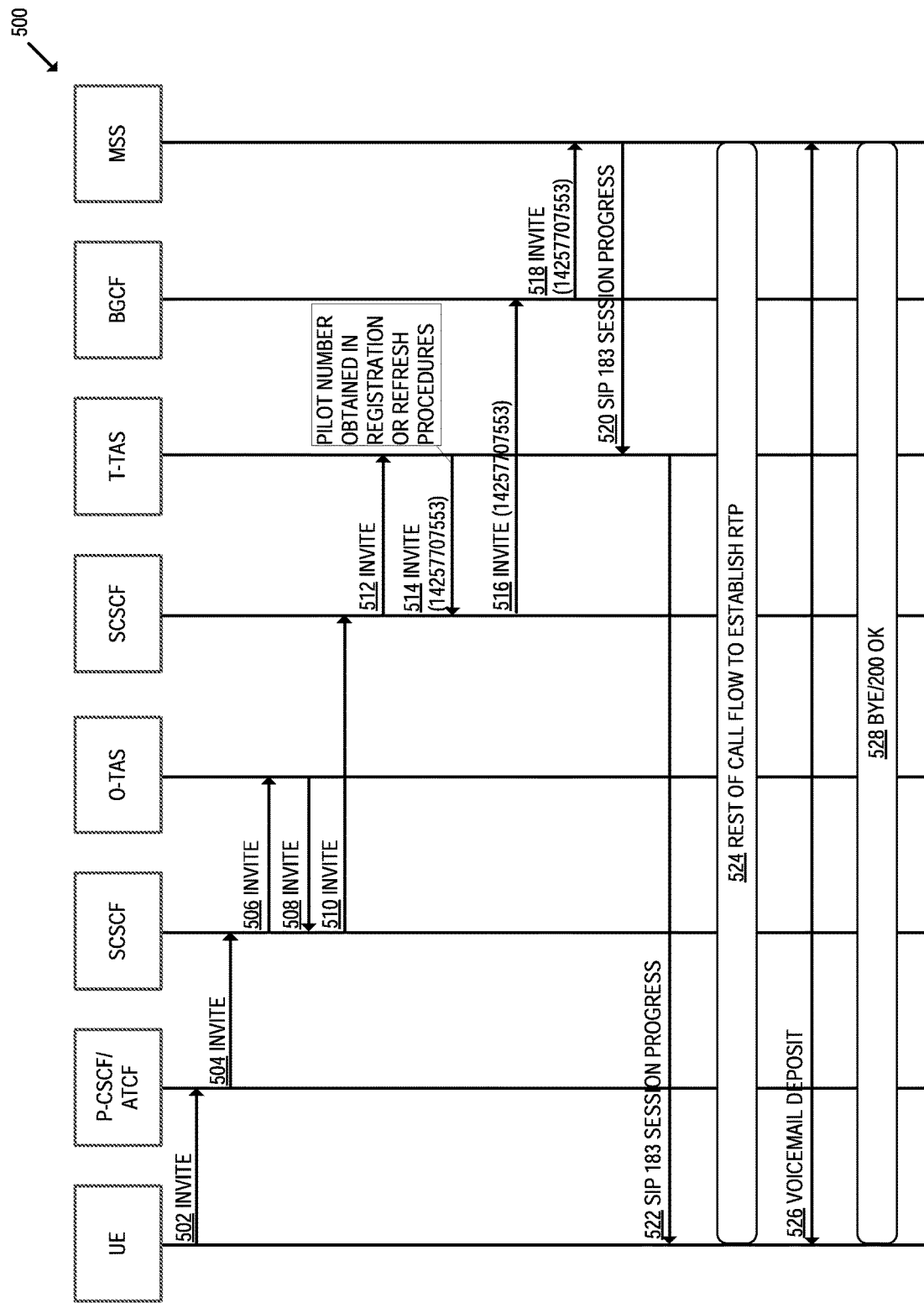
FIG. 5 is a flow diagram that illustrates a process for depositing a voicemail message according to some embodiments of the present disclosure.
Figure 6:
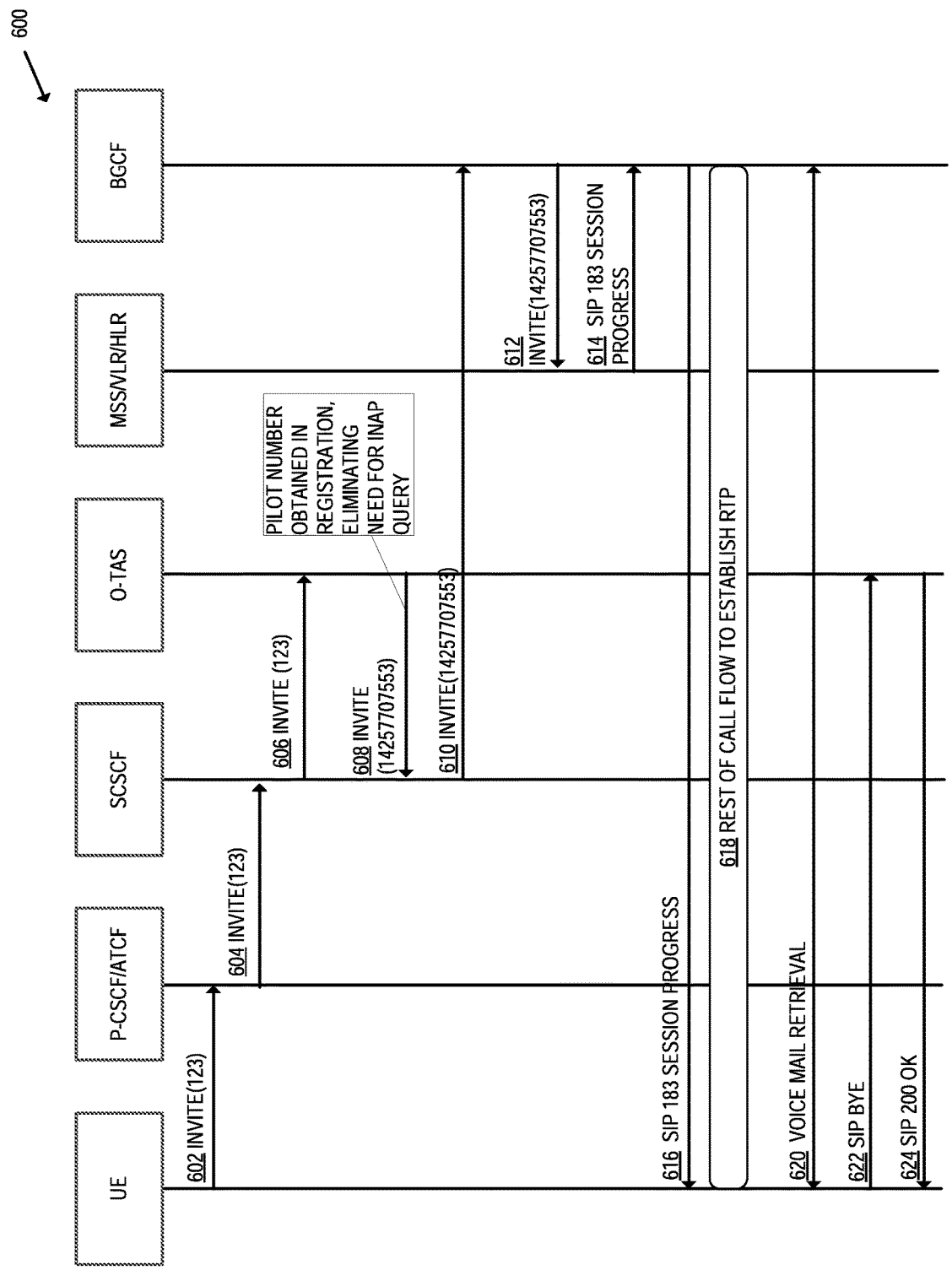
FIG. 6 is a flow diagram that illustrates a process for retrieving a voicemail message according to some embodiments of the present disclosure.

FIG. 4 is a flow diagram that illustrates a process 400 for dynamically updating a pilot number maintained at a TAS according to some embodiments of the present disclosure. The process 400 involves a change in a subscriber's pilot number. In some embodiments, the update procedure is invoked when a change in the pilot number is detected. In some embodiments, the update procedure is scheduled or performed on demand. In 402, the voicemail retrieval provisioning (VMR-PP) sends an updated pilot number to the HSS. In 404, the HSS forwards the pilot number in a Diameter push notification request (PNR) to the O-TAS. The Diameter PNR includes an AVP with the updated pilot number. In 406, the O-TAS responds with the Diameter push notification answer (PNA) that indicates to the O-TAS that it was successfully updated with the new pilot number. As such, the TAS maintains current subscriber profile information including the new pilot number, which was updated independent of procedures to deposit or retrieve voicemail messages FIGS. 5 and 6 are flow diagrams that illustrate procedures to deposit and retrieve voicemail messages, respectively, by using the pilot number retrieved by the TAS during a registration or update process thereby eliminating the need to issue SS7 query signals for the pilot numbers. Specifically, FIG. 5 is a flow diagram that illustrates a process 500 to deposit a voicemail message according to some embodiments of the present disclosure. Specifically, the process 500 uses a call forwarding unconditional (CFU) procedure to deposit the voicemail. In 502, the UE initiates an INVITE message to the P-CSCF/ATCF. A caller sends this message to request that another endpoint join a SIP session of a call. In 504, the P-CSCF/ATCF sends an INVITE message to the SCSCF. In 506, the SCSF sends an INVITE message to the O-TAS. In 508, the O-TAS responds with an INVITE message to the SCSCF. In 510, an INVITE message is sent to another SCSCF of the terminating UE. In 512, an INVITE message is sent from the SCSCF to the terminating-TAS (T-TAS).

In 514, the T-TAS returns an INVITE message with the retrieved pilot number to route a voicemail message for deposit by a subscriber. Because the CFU to voicemail is activated, the T-TAS uses the pilot number received in the SNA during a prior registration procedure to send out an INVITE message with the pilot number. Hence, this eliminates the need for the T-TAS to send an SS7 query for the pilot number during the procedure for depositing the voicemail.

In 516, the SCSCF sends an INVITE message by using the retrieved pilot number (e.g., 14257707553) to the breakout gateway control function (BGCF). In 518, the BGCF sends an INVITE message to the mobile switching station (MSS). In 520, the MSS responds by initiating a SIP 183 session progress message to the T-TAS. In 522, a SIP 183 session progress message is communicated from the T-TAS to the UE. In 524, the rest of the call flow to occurs to establish an RTP, which is shown in an abbreviated form for the sake of brevity. In 526, the voicemail is deposited to the MSS. In 528, a BYE/OK message ends the session or declines to take a call.

Figure 7:
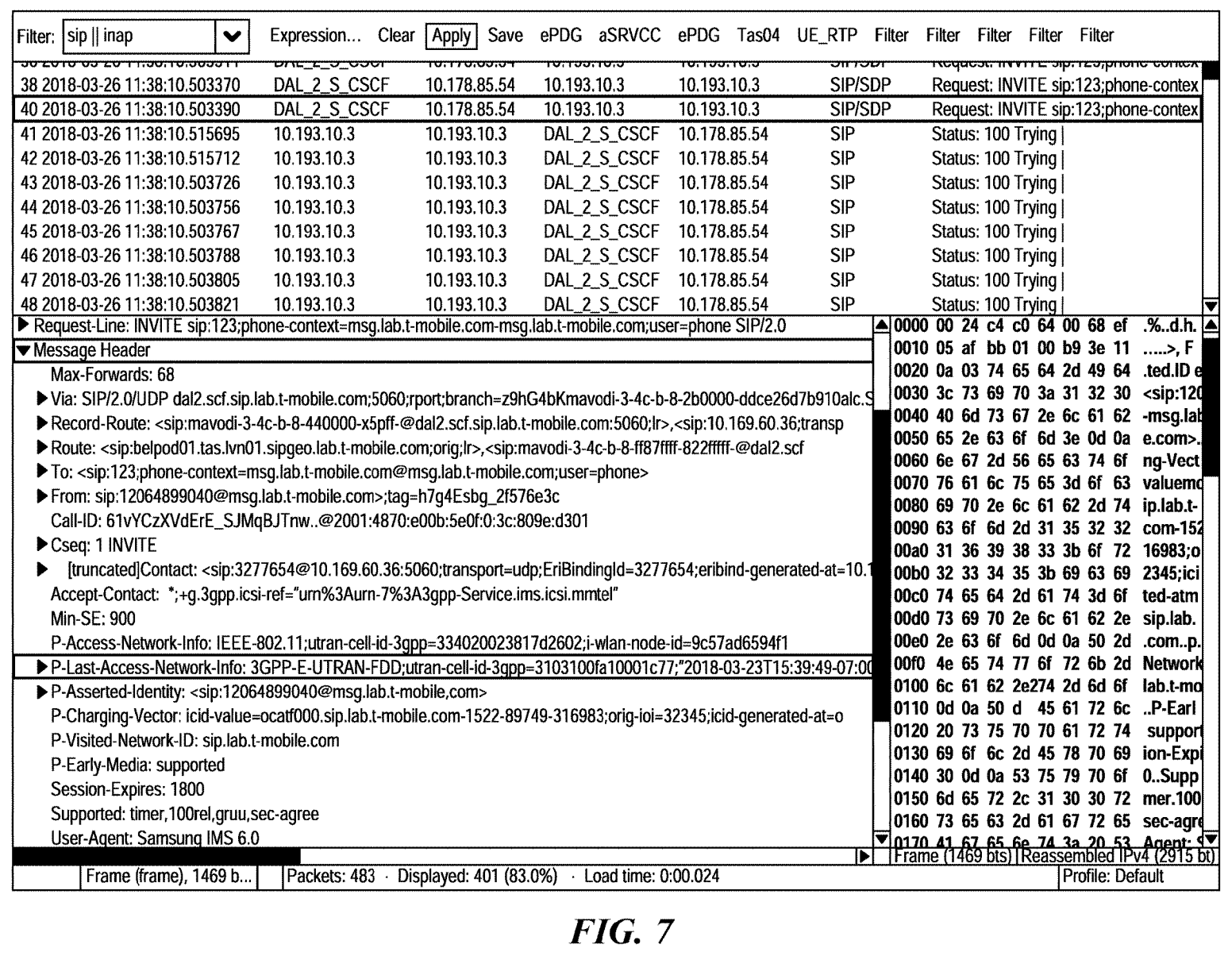

FIG. 6 is a flow diagram that illustrates a process 600 to retrieve a voicemail message according to some embodiments of the present disclosure. In some embodiments, a subscriber can dial a number on the subscriber's UE to retrieve a voicemail message. For example, FIG. 7 illustrates an INVITE message sent when a user dials a number to retrieve a voicemail message from a voicemail server. Specifically, the INVITE message is sent to the TAS when a user dials "123" to retrieve a voicemail message.

Figure 8:
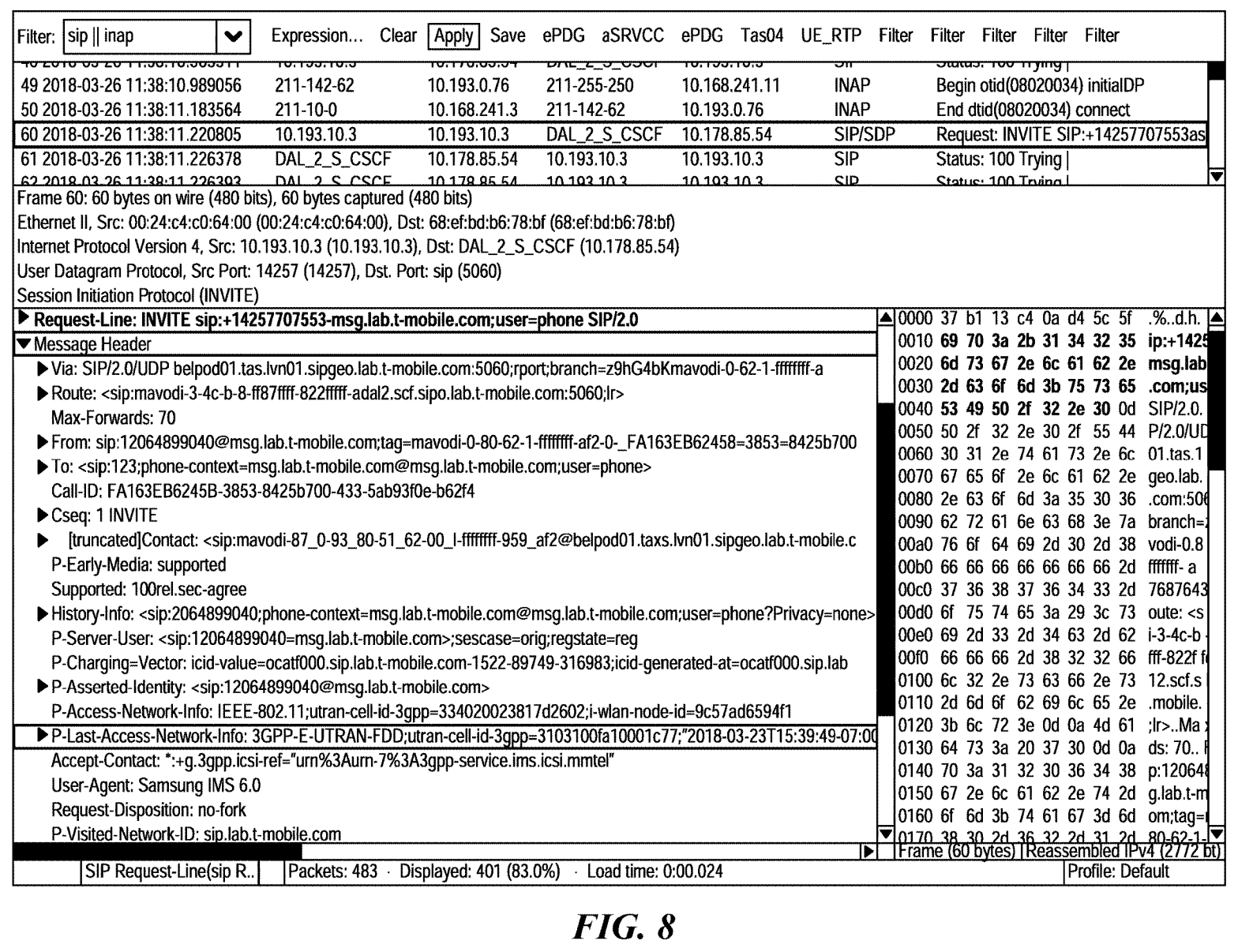

As shown in FIG. 6, the UE sends an INVITE message to the P-CSCF/ATCF in 602. In the example, the INVITE message is sent in response to a user dialing "123" on the UE to access stored voicemails. In 604, the P-CSCF/ATCF sends an INVITE message to the SCSCF. In 606, the SCSF sends an INVITE message to the O-TAS. In 608, the O-TAS responds with an INVITE message to the SCSCF. In 608, the O-TAS returns an INVITE message including the pilot number (e.g., 14257707553) for the subscriber seeking to retrieve the stored voicemail messages. FIG. 8 illustrates an INVITE message sent by a TAS, which could be modified to include the requested pilot number. That is, the INVITE message is sent out by the TAS and includes the pilot number.

The T-TAS uses the pilot number that was received in the SNA during a registration or update procedure to send an INVITE message to retrieve a voicemail message. Hence, this eliminates the need for the TAS to send a SS7 query for the pilot number during the procedure for retrieving the voicemail message. In 610, the SCSCF sends an INVITE message to the BGCF by using the retrieved pilot number. In 612, the BGCF sends an INVITE message to the MSS/VLR/HLR. In 614, the MSS/VLR/HLR responds by initiating a SIP 183 session progress message to the BGCF. In 616, a SIP 183 session progress message is sent from the BGCF to the UE. In 618, the rest of the call flow occurs to establish an RTP, which is shown in an abbreviated form for the sake of brevity. In 620, the voicemail message is retrieved by the UE from the MSS. In 622, a BYE message is sent to the O-TAS to end the session. The O-TAS responds with an OK message in 624.

An error condition exists when the SNR/SNA message exchange fails to obtain a pilot number during the registration process shown in FIG. 1. Another error condition exists when the PNR/PNA message exchange fails to dynamically update the pilot number maintained at the TAS in the process shown in FIG. 4. In either case, the current pilot number is not available at the TAS to deposit or retrieve voicemail messages as shown in FIGS. 5 and 6, respectively.

The disclosed embodiments include a solution to the error conditions that result when a TAS fails to obtain the pilot number during the registration process or dynamic update process. For example, the T-TAS or O-TAS can perform a Diameter command request/answer exchange of user data to update a pilot number. In particular, the TAS can send a user data request (UDR) message and receive a user data answer (UDA) message that includes the updated pilot number. As such, a call can continue with the updated pilot number. FIGS. 9 and 10 illustrate examples of a UDR message and UDA message, respectively, according to some embodiments of the present disclosure. Therefore, this method can be used to retrieve a pilot number as a solution to the error conditions where a pilot number is not retrieved during the registration or dynamic update processes.

Figure 11:
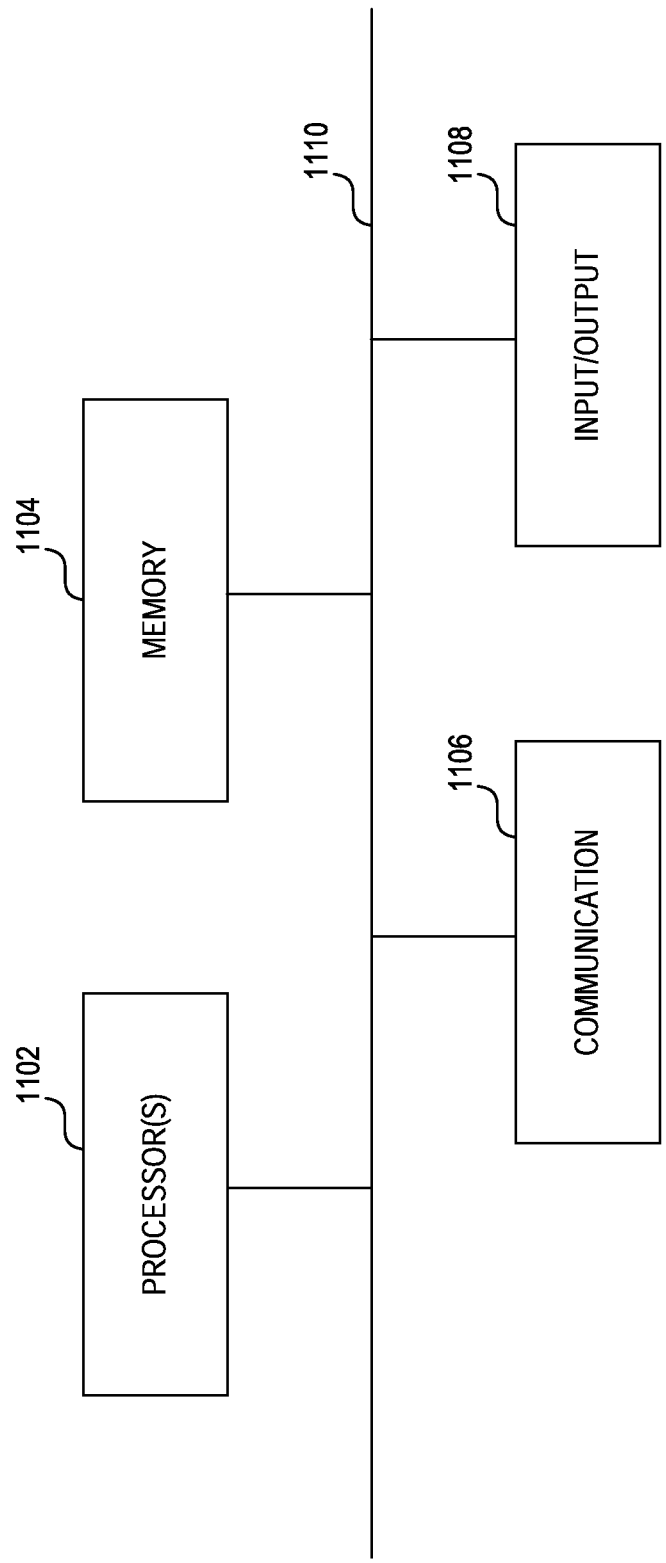
FIG. 11 is a block diagram that illustrates an example processing system in which aspects of the disclosed technology can be embodied.

FIG. 11 is a block diagram illustrating an example of a processing system 1100 in which at least some operations described herein can be implemented. The processing system 1100 represents a system that can run any of the methods/algorithms described above. The processing system 1100 may include one or more processing devices, which may be coupled to each other via a network or multiple networks. A network can be referred to as a communication network or telecommunications network.

In the illustrated embodiment, the processing system 1100 includes one or more processors 1102, memory 1104, a communication device 1106, and one or more input/output (I/O) devices 1108, all coupled to each other through an interconnect 1110. The interconnect 1110 may be or include one or more conductive traces, buses, point-to-point connections, controllers, adapters and/or other conventional connection devices. Each of the processor(s) 1102 may be or include, for example, one or more general-purpose programmable microprocessors or microprocessor cores, microcontrollers, application specific integrated circuits (ASICs), programmable gate arrays, or the like, or a combination of such devices.

The processor(s) 1102 control the overall operation of the processing system 1100. Memory 1104 may be or include one or more physical storage devices, which may be in the form of random-access memory (RAM), read-only memory (ROM) (which may be erasable and programmable), flash memory, miniature hard disk drive, or other suitable type of storage device, or a combination of such devices. Memory 1104 may store data and instructions that configure the processor(s) 1102 to execute operations in accordance with the techniques described above. The communication device 1106 may be or include, for example, an Ethernet adapter, cable modem, Wi-Fi adapter, cellular transceiver, Bluetooth transceiver, or the like, or a combination thereof. Depending on the specific nature and purpose of the processing system 1100, the I/O devices 1108 can include devices such as a display (which may be a touch screen display), audio speaker, keyboard, mouse or other pointing device, microphone, camera, etc.

While processes or blocks are presented in a given order, alternative embodiments may perform routines having steps or employ systems having blocks, in a different order, and some processes or blocks may be deleted, moved, added, subdivided, combined and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

Note that any and all of the embodiments described above can be combined with each other, except to the extent that it may be stated otherwise above, or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with processing system 1100 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory may be volatile or non-volatile memory. In some embodiments, the volatile memory may be considered "non-transitory" in the sense that it is not a transitory signal. Memory space and storage described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method steps or a method step of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems and devices described above may include additional, fewer, or different functional components for various applications.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks or employ systems having blocks, in a different order, and some processes or blocks may be deleted, moved, added, subdivided, combined, and/or modified to provide alternative or sub-combinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements, blocks and acts of the various implementations described above can be combined to provide further implementations.

Any patents and applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects may likewise be implemented in a computer-readable medium. Accordingly, the inventors reserve the right to add additional claims after filing the application to pursue such additional claim forms for other aspects of the technology.

I claim:

1. A method to retrieve a voicemail pilot number during registration of a user equipment (UE) to a telecommunications network, the method comprising:
   receiving, at a Telephony Application Server (TAS), a registration message to register the UE,
      wherein the UE is associated with a subscriber to the telecommunications network;
   responsive to the registration message, sending, by the TAS, a request message to a home subscriber server (HSS),
      wherein the request message is based on Diameter protocol and includes an attribute-value pair (AVP) with a request for a voicemail pilot number of the subscriber;
   responsive to the request message, receiving an answer message from the HSS,
      wherein the answer message is based on Diameter protocol and includes an AVP with the voicemail pilot number for the subscriber;
   storing the voicemail pilot number at the TAS,
      wherein the voicemail pilot number is stored at the TAS in association with the subscriber, and
      wherein the voicemail pilot number is available from a server other than the TAS by issuing an SS7 query for the server other than the TAS;
   receiving a voicemail service message to deposit or retrieve a voicemail message;
   responsive to the voicemail service message, retrieving the voicemail pilot number from the TAS instead of from the server other than the TAS; and
   enabling the subscriber to deposit or retrieve the voicemail message based on the voicemail pilot number retrieved from the TAS.

2. The method of claim 1, wherein the SS7 query is an intelligent network application protocol (INAP) query.

3. The method of claim 1, wherein the registration of the UE is part of a refresh procedure to periodically re-register the UE to the telecommunications network.

4. The method of claim 1, wherein the request message is a subscriber notification request (SNR) message.

5. The method of claim 1, wherein the answer message is a subscriber notification answer (SNA) message, and wherein the SNA message includes the voicemail pilot number of the subscriber.

6. The method of claim 1, wherein the registration message is a third-party registration message.

7. The method of claim 1, wherein the voicemail pilot number is stored in a subscriber profile that includes information about capabilities of the UE.

8. The method of claim 1 further comprising:
   utilizing the voicemail pilot number stored at the TAS to deposit the voicemail message at a voicemail server.

9. The method of claim 1 further comprising:
   utilizing the voicemail pilot number stored at the TAS to retrieve the voicemail message from a voicemail server.

10. The method of claim 1 further comprising:
    receiving a message indicating that a change in the voicemail pilot number was detected;
    updating the TAS to reflect the change in the voicemail pilot number;

receiving another voicemail service message to deposit or retrieve another voicemail message;

retrieving the changed voicemail pilot number stored at the TAS instead of issuing an SS7 query to obtain the changed voicemail pilot number; and enabling the subscriber to deposit or retrieve the other voicemail message based on the changed voicemail pilot number retrieved from the TAS.

11. The method of claim 1 further comprising, prior to receiving the voicemail service message:

completing the registration of the UE to the telecommunications network.

12. A non-transitory computer-readable storage medium that stores instructions to be executed by at least one processor, wherein the instructions cause a Telephony Application Server (TAS) to perform a method for depositing or retrieving a voicemail message without needing to issue an SS7 query for a voicemail pilot number, the method comprising:

facilitating registration of a user equipment (UE),
wherein the UE is associated with a subscriber to a telecommunications network;

sending a request for a voicemail pilot number of the subscriber,
wherein the request is based on Diameter protocol and includes an attribute-value pair (AVP);

obtaining the voicemail pilot number at the TAS,
wherein the voicemail pilot number is also available to the TAS, in response to an SS7 query, from a voicemail server;

receiving a message for a voicemail service by the UE of the subscriber;

retrieving the voicemail pilot number of the TAS in lieu of issuing the SS7 query to obtain the voicemail pilot number from the voicemail server; and enabling the subscriber to deposit or retrieve the voicemail message based on the voicemail pilot number retrieved from the TAS.

13. The non-transitory computer-readable storage medium of claim 12, wherein obtaining the voicemail pilot number for the TAS comprises:

obtaining the voicemail pilot number by the TAS during a registration of the UE.

14. The non-transitory computer-readable storage medium of claim 12, wherein obtaining the voicemail pilot number for the TAS comprises:

obtaining the voicemail pilot number by the TAS during a refresh of the UE.

15. The non-transitory computer-readable storage medium of claim 12, wherein obtaining the voicemail pilot number for the TAS comprises:

obtaining the voicemail pilot number from a home subscriber server (HSS).

16. A system for retrieving a voicemail pilot number, the system comprising:

one or more memories of a telecommunications network that stores instructions for depositing or retrieving voicemail messages and subscriber information including a voicemail pilot number for a subscriber to the telecommunications network,
wherein the subscriber information is stored at a first telecommunications node; and one or more processors of the telecommunications network configured to execute the instructions stored on the one or more memories in response to an indication that a change in the voicemail pilot number was detected,
wherein the change in the voicemail pilot number was detected by a second telecommunications node different from the first telecommunications node, and
wherein execution of the instructions cause the system to:

update the one or more memories to reflect the changed voicemail pilot number,
wherein the changed voicemail pilot number is also available from a server by issuing an SS7 query for the server;

receive a message to deposit or retrieve a voicemail message by the subscriber; and retrieve the changed voicemail pilot number stored in the one or more memories instead of issuing the SS7 query to obtain the changed voicemail pilot number from the server to thereby enable the subscriber to deposit or retrieve the voicemail message based on the voicemail pilot number retrieved from the one or more memories.

17. The system of claim 16, wherein the subscriber information is stored at a Telephony Application Server (TAS).

18. The system of claim 16, wherein the system is further caused to:

utilize the voicemail pilot number stored in the one or more memories to deposit the voicemail message at a voicemail server.

19. The system of claim 16, wherein the system is further caused to:

utilize the voicemail pilot number stored in the one or more memories to route to a voicemail server that contains a voicemail message for the subscriber.

* * * * *